(12) United States Patent
Lohmann et al.

(10) Patent No.: US 9,376,210 B2
(45) Date of Patent: Jun. 28, 2016

(54) CARGO HANDLING SYSTEM

(71) Applicant: AIRBUS OPERATIONS GMBH, Hamburg (DE)

(72) Inventors: Ali Lohmann, Sottrum (DE); André Koehler, Bremen (DE); Johannes Voelker, Bremen (DE); Christian Grambole, Reessum (DE); Matthias Ulbrich, Syke (DE); Joerg Pump, Hamburg (DE); Soenke Hager, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/304,243

(22) Filed: Jun. 13, 2014

(65) Prior Publication Data

US 2014/0367515 A1 Dec. 18, 2014

(30) Foreign Application Priority Data

Jun. 17, 2013 (EP) ..................... 13172301

(51) Int. Cl.
*B60P 7/08* (2006.01)
*B64D 9/00* (2006.01)

(52) U.S. Cl.
CPC ................. *B64D 9/00* (2013.01); *B60P 7/0892* (2013.01)

(58) Field of Classification Search
CPC .......... B64D 9/00; B64D 9/003; B60P 7/0892
USPC ................. 410/69, 77, 80, 92, 94; 244/118.1, 244/137.1
See application file for complete search history.

(56) References Cited

U.S. PATENT DOCUMENTS

| | | | |
|---|---|---|---|
| 4,234,278 A * | 11/1980 | Harshman et al. | 410/69 |
| 4,349,168 A * | 9/1982 | Barnes et al. | |
| 4,457,649 A | 7/1984 | Vogg et al. | |
| 4,875,645 A | 10/1989 | Courter | |
| 5,090,639 A | 2/1992 | Miller et al. | |
| 5,234,297 A * | 8/1993 | Wieck et al. | 410/77 |
| 6,773,213 B1 | 8/2004 | Moradians | |
| 2010/0209209 A1 | 8/2010 | Schulze | |

FOREIGN PATENT DOCUMENTS

FR 2 500 805 9/1982

OTHER PUBLICATIONS

European Search Report for Application No. 13 17 2301 dated Nov. 29, 2013.

* cited by examiner

*Primary Examiner* — Stephen Gordon
(74) *Attorney, Agent, or Firm* — Jenkins, Wilson, Taylor & Hunt, P.A.

(57) ABSTRACT

The invention relates to a cargo handling system for loading and securing one or more freight containers in a cargo hold of an aircraft. The system includes bracket members configured to be secured to a base or floor of the cargo hold, and elongate guide members, each of which is mounted on and interconnects a number of the bracket members arranged in a row, wherein each guide member forms a restraint or a stop against lateral movement of a freight container loaded in the cargo hold. The bracket members include at least one fastening portion configured for tool-less fast-release engagement and locking with a seat track profile in the base or floor of the cargo hold. Furthermore, the bracket members typically extend transversely inwards or inboard of the elongate guide members.

13 Claims, 3 Drawing Sheets

CARGO HANDLING SYSTEM

CROSS-REFERENCE TO RELATED APPLICATION

This application claims the benefit of and priority to European patent application No. 13 172 301.7 filed Jun. 17, 2013, the entire disclosure of which is herein incorporated by reference.

TECHNICAL FIELD

This invention relates to a cargo handling system, especially for an aircraft, and to a vehicle, such as an aircraft, that incorporates such a cargo handling system.

TECHNICAL BACKGROUND

Shipping containers or ISO freight containers, also known as "intermodal" containers, have become a global standard (DIN/ISO 668) in freight transport. A major advantage of these ISO containers is that they are able to be moved from one mode of transport to another (e.g. from ship to rail to truck) without needing to unload or reload the contents of the container. In other words, they are suitable for movement between different "modes" of transport, such as sea, rail and/or road. Aircraft are generally not equipped to transport ISO containers. It is therefore usually not possible for a freighter aircraft to take such containers delivered by a ship, train, or lorry and transport them to a destination that may only be accessible by air. Instead, there are other types of containers that have been specifically designed for air freight transport, such as the air/surface containers (DIN/ISO 8323).

Further, conventional cargo handling systems for transporting containers as air freight involve relatively complicated and time-consuming installation procedures. That is, deploying or removing known cargo handling systems with respect to a cargo hold of an aircraft typically results in the aircraft being out of service for an extended period of time while the cargo handling system is assembled in, or demounted from, the hold of the aircraft.

SUMMARY

A new and improved cargo handling system is provided that is suitable for loading and securing freight containers in an aircraft cargo hold. In this regard, it would be particularly desirable to provide such a new and improved cargo handling system that is suitable for use with both ISO freight containers as well as with surface/air containers. It would also be desirable to provide such a new and improved cargo handling system that is able to be both quickly assembled and quickly demounted in a cargo hold of an aircraft.

According to one aspect, therefore, the disclosure provides a cargo handling system for loading and securing one or more freight containers in a cargo hold of an aircraft, the system comprising:

a plurality of bracket members, each of which is configured to be secured to a base or floor of the cargo hold; and a plurality of elongate guide members, each of which is securely mounted on and interconnects a number of the bracket members arranged in a row;

wherein each guide member forms a restraint or stop against lateral movement of a freight container loaded in the cargo hold, and wherein each bracket member includes at least one fastening portion configured for tool-less fast-release engagement and locking with a seat track profile in the base or floor of the cargo hold.

In this way, the present disclosure provides an improved cargo handling system that can be quickly and easily installed in a cargo hold of an aircraft by taking advantage of the existing seat tracks in the fuselage structure.

In an embodiment, the at least one fastening portion of each bracket member comprises an activation mechanism for switching between a locked state, in which the bracket member is secured to the seat track profile, and a released state, in which the bracket member is released and separable from the seat track profile. The activation mechanism is desirably manually operable to switch between the locked state and the released state. Thus, the activation mechanism may include a manually operable activation member, such as a lever. As will be appreciated, however, the activation mechanism may include an electrically operable activation member as an alternative.

By configuring a fastening portion of each bracket member for tool-less fast-release engagement and locking with the seat track profile, the bracket members can be quickly and easily anchored to the floor or base of the cargo hold. That is, the fastening portion can simply be switched between the locked state and the released state via the activation mechanism in fastening portion of each bracket member without the need for time-consuming use of separate anchors or fasteners, such as bolts or screws, and corresponding tools. Rather, a fastening system is integrated in each bracket member for cooperation with seat track profiles incorporated in the floor or base of the cargo hold.

In a further embodiment, the at least one fastening portion of each bracket member comprises one or more fixing elements configured to engage and lock with the seat track profile in the locked state. The one or more fixing elements may include one or more tension stud and/or one or more shear stud, which are configured to engage and lock with the seat track profile when an activation member is operated to switch the fastening portion of the bracket member to the locked state.

In a further embodiment, the plurality of bracket members are generally elongate, and may be arranged in rows, such that they extend substantially parallel to one another and transverse to a loading direction. Further, the plurality of elongate guide members are configured to be mounted on and to interconnect end regions of the bracket members arranged in a row, wherein the bracket members extend transversely inwards or inboard of the elongate guide members. In this way, each of the bracket members is arranged to be below or underneath a freight container loaded and secured with the cargo handling system. This arrangement has the advantage that the bracket members are positioned to be substantially unable to impinge or impact upon any forward safety netting for restraining the container in the event that one or more of the bracket members should release from the floor or base of the cargo hold.

Thus, according to another aspect, the disclosure provides a cargo handling system for loading and securing one or more freight containers in a cargo hold, especially a cargo hold of an aircraft, the system comprising:

a plurality of elongate bracket members, each of which is configured to be secured to a base or floor of the cargo hold, wherein the bracket members are arranged in rows and extend substantially parallel to one another and transverse to a loading direction; and a plurality of elongate guide members, each of which is mounted on and interconnects end regions of a number of the bracket members arranged in a row;

wherein each guide member is configured to provide a stop or restraint to lateral movement of a freight container loaded in the cargo hold, and wherein the bracket members extend transversely inwards or inboard of the elongate guide members.

Because the bracket members, which are secured to the base or floor of the cargo hold, are arranged extending transversely inwards or inboard of the elongate guide members in the cargo handling system of the invention, these bracket members are arranged to be below or underneath a freight container loaded and secured with the cargo handling system, so the transverse brackets do not interfere with neighbouring areas of the cargo hold and a freight area for containers placed alongside one another can be optimised.

In a further embodiment, each guide member is arranged to extend adjacent a lower side or longitudinal edge of the freight container to provide a restraint or stop against unwanted lateral or sideways movement of the freight container in the cargo hold, i.e. in a direction transverse to the loading and unloading direction. To this end, at least one guide member may extend on each of opposite lower longitudinal edges or lower side edges of the freight container. In this way, the guide members can restrain or stop undesirable lateral or sideways movement of the freight container in both lateral directions in the cargo hold. In addition, the guide members also serve to guide movement of the container during its loading into and/or unloading from the cargo hold. The guide members are typically formed of a tough and robust material, such as a metal, examples of which include aluminium alloys, titanium alloys, and steel. Thus, the elongate guide members may take the form of guide rails.

In a further embodiment, each guide member interconnects with each respective end region of the said number of the bracket members arranged in a row via an interconnection mechanism. Like the manner in which each bracket member is secured to the base or floor of the hold via the fastening portion, the interconnection mechanism is configured for a tool-less and fast-release secure attachment of each guide member to the respective bracket members. The interconnection mechanism may, in this context, comprise one or more projections, such as one or more tongues, each of which projects in a direction that is substantially perpendicular to the base or floor of the cargo hold to which the bracket members are secured or anchored. Further, the interconnection mechanism may include one or more corresponding slots or grooves, within each of which a respective one of the one or more projections can then be received. Optionally, the one or more projections or tongue members (e.g. there may be two) project downwards from each elongate guide member to be received in corresponding slots or grooves formed in each respective end region of the inter-connected bracket members. Optionally, locking pins may also be provided, which are configured to be inserted through each of the projections or tongue members to fix them against their removal or separation from the slots or grooves.

In a further embodiment, each bracket member of the system includes at least one fastening portion with which the bracket member is secured to the base or floor of the cargo hold. In this regard, as noted above, the fastening portion may be configured to engage and lock with a seat track profile in the base or floor of the cargo hold. As aircraft for both civil and military applications typically have seat tracks as a standard feature integrated in the floor of the fuselage structure, these tracks may be used for anchoring the cargo handling system of the invention to the fuselage structure of the aircraft via the plurality of bracket members. The at least one fastening portion on each bracket member may be located inwards or inboard of the guide member connected with the end region thereof, such that the anchoring of the cargo handling system may occur between the lateral guide members and is typically then below and covered by the containers.

In a further embodiment, each of the elongate guide members includes at least one locking mechanism, and preferably a plurality of them, for engaging and locking the freight container, or a pallet upon which a freight container is supported, against movement in the loading direction or a longitudinal direction of the freight container and/or in a vertical direction during transport. Each locking mechanism may include a latch that is movable between a retracted position and an extended position, as well as an actuating member manually operable to actuate movement of the latch between the retracted and extended positions. The actuating member may be positioned and configured for operation by foot so that a worker, e.g. the cargo master, loading or unloading freight containers does not need bend down to the base or floor of the cargo hold to operate the locking mechanisms by hand. For example, the actuating member of each locking mechanism may be a foot-operated lever, and is desirably provided on a laterally outward or outboard side of the guide member. The latch of each locking mechanism, on the other hand, may be configured to project from the guide member in the laterally inward or inboard direction in the extended position. It may be possible that each elongate guide member or guide rail includes a number of the locking mechanisms; e.g. corresponding to a number of bracket members that this guide member or guide rail interconnects, with each of the locking mechanisms optionally being aligned with one of the bracket members. This provides a particularly stable structure in the cargo handling system.

In a further embodiment, each freight container includes a recess between abutments or shoulders for receiving the latch of a respective locking mechanism when the latch is moved to the extended position. These abutments or shoulders interact with the latch to hold or restrain the freight container in the loading direction or a longitudinal direction thereof, as well as in a vertical direction during transport. The recess is typically provided in a lower side edge region of the container. Indeed, the freight container may have a plurality of such recesses spaced along the lower side edge regions thereof for receiving the latch members of each of a plurality of the locking mechanisms. In this regard, some freight containers, such as the air/surface containers (DIN/ISO 8323) incorporate such recesses in their structure. Other containers, such as the ISO or "intermodal" containers (DIN/ISO 668) are transported on pallets, such as PGF pallets, which are equipped with ISO corners or marine pins at their corners to match the containers. In this case, each recess between abutments or shoulders for receiving the latch of a locking mechanism is provided along a longitudinal edge or side edge of the pallet at the lower side edge region of the ISO container.

In another embodiment, the cargo handling system of the invention further comprises a plurality of rollers configured and arranged to support the one or more freight containers for rolling movement during loading or unloading, i.e. in the loading direction. To this extent, the rollers are arranged between a pair of the elongate guide members or rails, each of which extends adjacent a lower longitudinal edge or lower side edge of the freight container in the loading direction. The rollers may be provided on elongate support members that are configured both to support and convey a freight container as it is loaded into, or unloaded from, the cargo hold. The support members, which may be in the form of rails, extend in the loading direction or the longitudinal direction and may be arranged laterally inwards or inboard of the elongate guide members or guide rails.

According to another aspect, the present disclosure provides a vehicle, such as an aircraft or spacecraft, incorporating a cargo handling system according to any one of the embodiments described above. In this regard, a cargo hold of an aircraft will typically be within the fuselage of the aircraft.

BRIEF DESCRIPTION OF THE DRAWINGS

For a more complete understanding of the present invention and the advantages thereof, exemplary embodiments of the invention are explained in more detail in the following description with reference to the accompanying drawings, in which like reference characters designate like parts and in which.

The accompanying drawings are included to provide a further understanding of the present invention and are incorporated in and constitute a part of this specification. The drawings illustrate particular embodiments of the invention and together with the description serve to explain the principles of the invention. Other embodiments of the invention and many of the attendant advantages of the invention will be readily appreciated as they become better understood with reference to the following detailed description.

DETAILED DESCRIPTION

It will be appreciated that common and well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not necessarily required. It will also be understood that the terms and expressions used in the present specification have the ordinary meaning as is accorded to such terms and expressions with respect to their corresponding respective areas of inquiry and study, except where specific meanings have otherwise been set forth herein.

Figure 1:
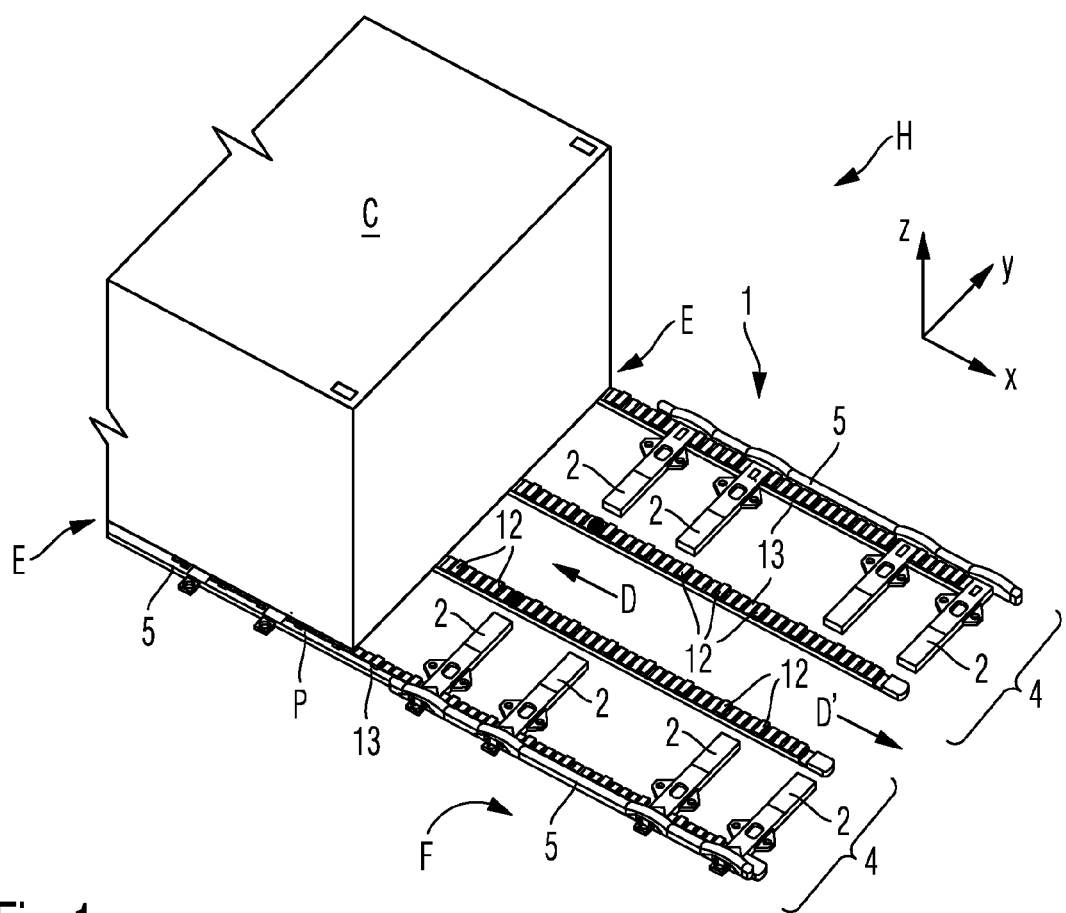
FIG. 1 is a schematic perspective view of a cargo hold in a fuselage of an aircraft, which incorporates a cargo handling system according to an embodiment of the invention.

Referring firstly to FIG. 1 of the drawings, a cargo handling system 1 according to a preferred embodiment of the invention is shown supporting an ISO or intermodal freight container C (DIN/ISO 668). The container C has a rectangular box shape with end dimensions of 8 ft×8 ft (i.e. 2.44 m×2.44 m) and a length of 20 ft (i.e. 6.10 m) and is supported on a PGF pallet P over its entire base. The cargo handling system 1 is incorporated in a cargo hold H in the fuselage of an aircraft (not shown) and is designed for loading the container C into the cargo hold H in a loading direction D and unloading it in an unloading direction D'. A Cartesian coordinate system (i.e. with axes x, y, z) is included in FIG. 1 for assistance in later explaining the manner in which the cargo handling system 1 of the invention secures and stabilizes the freight container C in the cargo hold H of the aircraft.

Figure 2:
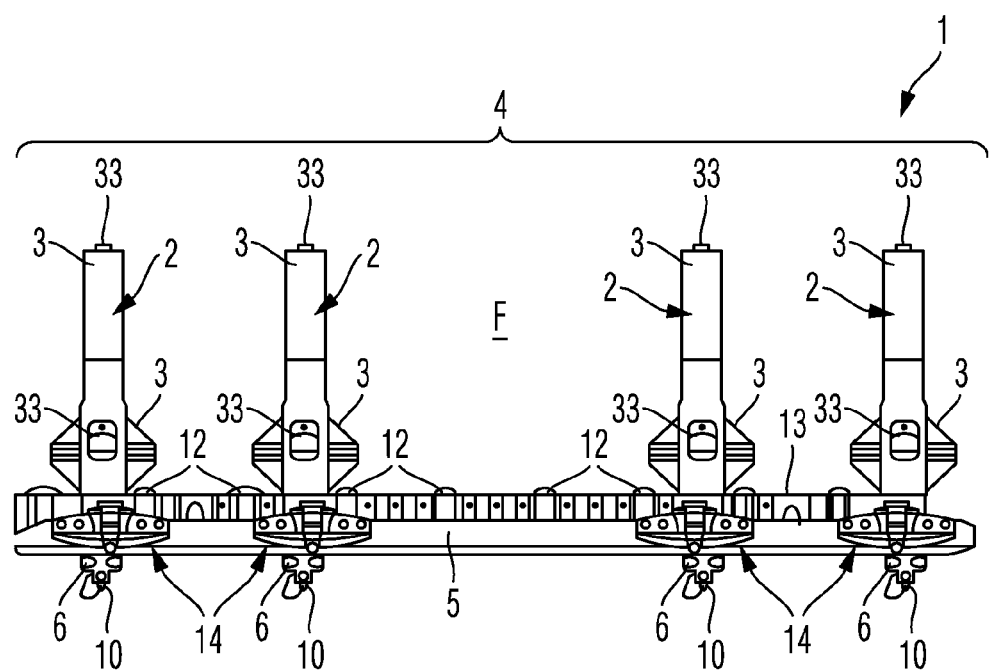
FIG. 2 is a view from above of part of the cargo handling system shown in FIG. 1.
Figure 3:
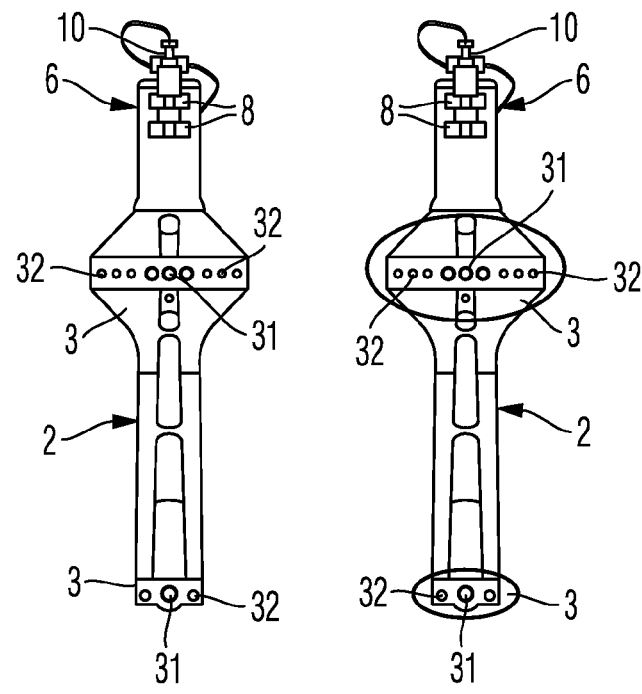
FIG. 3 is an underside view of two bracket members of the cargo handling system shown in FIG. 1.

Referring also now to drawing FIGS. 2 and 3, it can be seen that this embodiment of the cargo handling system 1 comprises a plurality of bracket members 2 having a generally elongate, rectangular form and incorporating two fastening portions 3 configured to be secured to a floor F of the cargo hold H. In particular, each fastening portion 3 includes fixing elements in the form of shear studs 31 and tension studs 32 configured to engage and lock with a seat track (not shown) in the floor F of the cargo hold H. Further, the fastening portion 3 has an activation member 33 in the form of a lever for switching the fixing elements 31, 32 between a released state, in which the bracket member 2 is separable from the seat track, and a locked state, in which the bracket member 2 is rigidly fixed or secured to the seat track by the fixing elements 31, 32. Thus, the fastening portions 3 of each bracket member 2 are configured for tool-less, fast-release engagement and locking with the seat track, and the bracket members 2 can be quickly and easily anchored to a fuselage structure of the aircraft via the floor F of the cargo hold H.

As is apparent from FIG. 1 and FIG. 2, the bracket members 2 are arranged substantially parallel with one another in rows 4 at laterally opposite sides of the cargo handling system 1. Also apparent from FIGS. 1 and 2, the system 1 includes a number of elongate guide members or guide rails 5, each of which is mounted on and extends between end regions 6 of four of the bracket members 2 that are arranged in a row 4 at opposite sides of the system 1.

Figure 4:
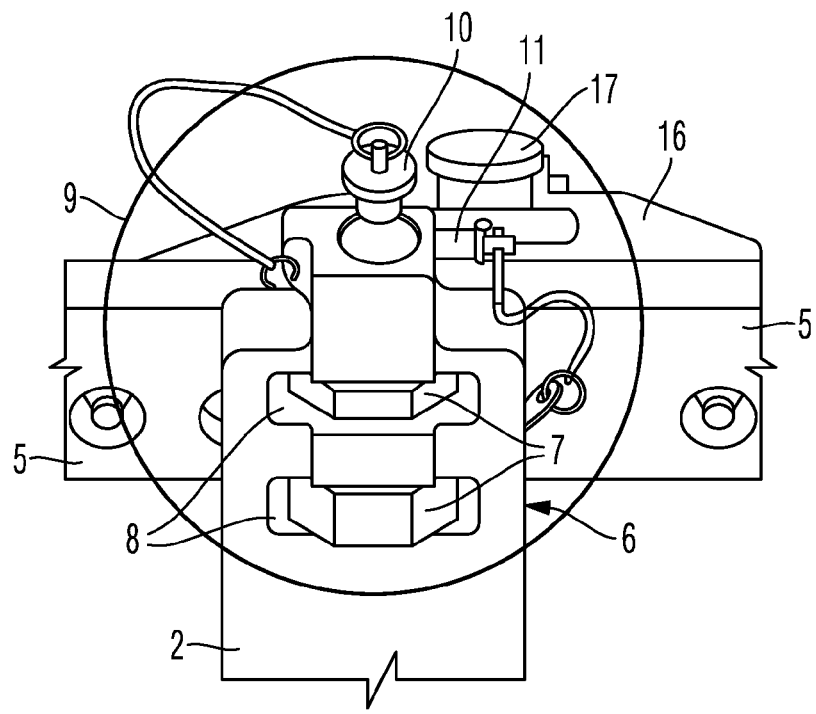
FIG. 4 is detailed perspective view of an interconnection mechanism between a guide member and bracket member of the cargo handling system shown in FIG. 1, seen from an underside of the bracket member.
Figure 5:
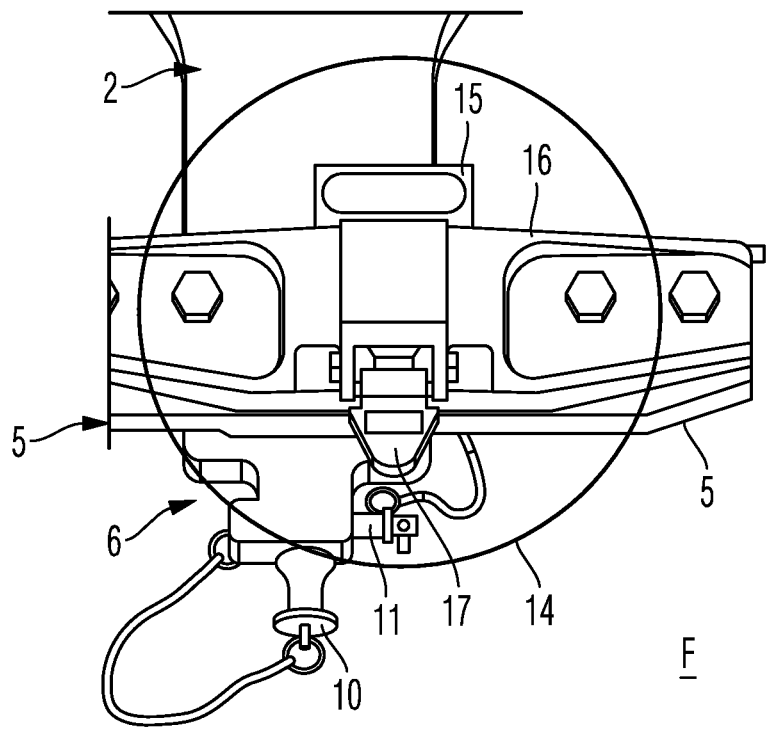
FIG. 5 is detailed view of a locking mechanism provided in a guide member of the cargo handling system shown in FIG. 1, seen from above.

With reference also now to FIG. 4 of the drawings, it will be noted that each guide member or guide rail 5 includes a pair of downwardly extending tongue members 7 which are sized and configured to be received in a pair of corresponding slots or apertures 8 at the end region 6 of each bracket member 2. The complementary tongue-end-groove configuration 7, 8 between the guide rails 5 and the bracket members 3 thus forms an interconnection mechanism 9 with which the respective guide rails 5 interconnect the end regions 6 of the four bracket members 2 in the row 4 shown in FIG. 2. The interconnection mechanism 9 desirably further includes a locking element 10, here in the form of a locking pin, which is inserted through a corresponding bore in the end region 6 of bracket member 2 (see FIG. 4 and FIG. 5) and extends through corresponding eyelets or holes in respective tongue members 7 projecting downwards from the guide rail 5 to prevent separation of the guide rail 5 from the bracket members 2 anchored to a floor F of the cargo hold H. In this way, the elongate guide members or guide rails 5 are respectively fixed at the end regions 6 of the bracket members 2, which themselves extend laterally inwards or inboard of each guide rail 5. To further inhibit or prevent inadvertent separation of the guide rails 5 from the anchored bracket members 2, additional retaining pin 11 may be provided as shown in FIG. 5. The retaining pin 11 is inserted transversely through the locking element or pin 10 to prevent it from loosening (e.g. due to vibration or loads in transit) or being inadvertently withdrawn from the bore in the end region 6 of each bracket member 2.

As is apparent from FIGS. 1 and 2 of the drawings, the cargo handling system 1 of this embodiment includes a plurality of rollers 12 which are arranged in rows to support the freight container C for rolling movement in the loading and unloading directions D, D' along the x-axis of the Cartesian coordinate system. In this embodiment, the rollers 12 are provided in elongate support members or rails 13, which are arranged to extend generally parallel to, and laterally inward or inboard of, the guide rails 5 interconnecting the ends of the bracket members 2. In this way, the guide members or guide rails 5 are mounted to extend along lower longitudinal edge regions E of the freight container C and provide a restraint or stop against lateral movement (i.e. in a y-axis direction) of the freight container C while supported on the cargo handling system 1. In other words, the guide rails 5 provide lateral restraint against any unwanted lateral or sideways movement of the freight container C. Furthermore, they guide movement of the container C on the rollers 12 as it is loaded and/or unloaded from the cargo hold H in the directions D, D'.

With reference now to drawing FIG. 5, a locking mechanism 14 for engaging and locking the pallet P (upon which the freight container C is supported) against movement in a longitudinal direction (i.e. along the x-axis) is illustrated. The locking mechanism 14 comprises a latch member 15 that is movable from a retracted position within a housing 16 of the locking mechanism 14 bolted onto the guide rail 5 to an extended position (shown in FIG. 5) in which it projects to the inward or inboard side of the guide rail 5. In the extended position the latch member 15 is received within a corresponding recess provided in the pallet P between abutments or shoulders which engage against the latch member 15 in event of any movement in the longitudinal (x-axis) direction. In addition, however, a base of the recess in the pallet P engages and interacts with the latch member 15 to hold or restrain the pallet P, and the container on it, from lifting off the cargo handling system 1 in the vertical direction (along the z-axis) during flight or transport in the aircraft. Thus, this recess in the pallet P forms a "keeper" for the latch 15. The locking mechanism 14 furthermore includes an actuating lever 17 on an outward or outboard side of the guide rail 5, with which an operator is able to actuate movement of the latch member 15 between the retracted and extended positions. The actuating lever 17 is configured for operation by foot so that a worker loading or unloading the cargo hold H need not bent down to the floor level F of the cargo hold to operate the locking mechanism 14 by hand. Also, in this position, the actuating lever 17 provides a clear indication for the operator as to whether the latch member 15 is in the extended or retracted position.

Referring back to FIGS. 1 and 2 of the drawings, it will be seen that several of these locking mechanisms 14 are provided spaced apart at intervals along each of the guide rails 5. In particular, a separate locking mechanism 14 is provided in approximate alignment with each of the bracket members 2 for engaging corresponding recesses or "keepers" in the pallet P, upon which the ISO freight container C is supported in the cargo handling system 1.

Figure 6:
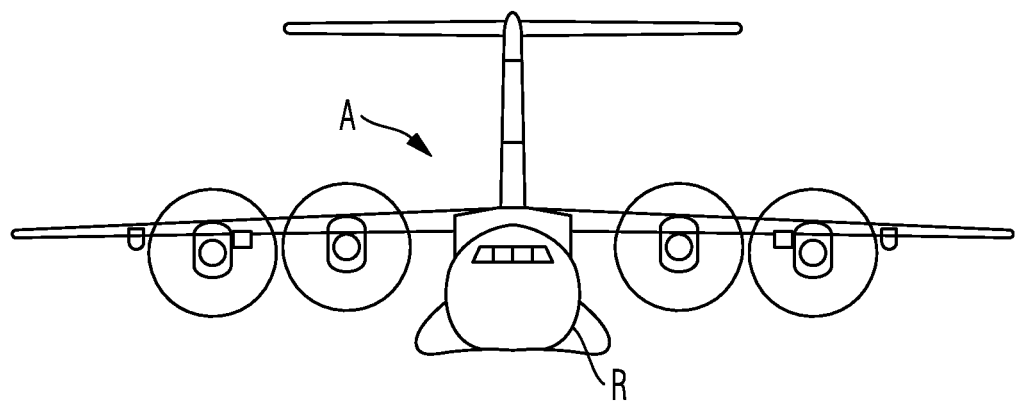
FIG. 6 is a schematic illustration of an aircraft in which one or more bracket according to an embodiment of the invention is installed.

Finally, FIG. 6 of the drawings schematically illustrates an aircraft A having a fuselage R, in which a cargo hold H is provided for transporting freight. The cargo hold H of the aircraft A comprises a cargo handling system 1 for loading and securing freight containers C according to the embodiment of the invention shown in FIGS. 1 to 5.

Although specific embodiments of the invention have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

What is claimed is:

1. A cargo handling system for loading and securing one or more freight containers in a cargo hold of an aircraft, the system comprising:
   a plurality of elongate bracket members, each of which is configured to be secured to a base or floor of the cargo hold, wherein the bracket members are arranged in rows and extend substantially parallel and transverse to a loading direction;
   a plurality of elongate guide members, each of which is mounted on and interconnects end regions of a number of the bracket members arranged in a row;
   wherein each guide member forms a restraint or stop against lateral movement of a freight container loaded in the cargo hold,
   wherein the bracket members extend transversely inwards or inboard of the elongate guide members, and
   wherein each guide member interconnects with the bracket members via an interconnection mechanism, the interconnection mechanism comprising at least one projection that projects in a direction substantially perpendicular to the base or floor of the cargo hold to be received in a corresponding slot or groove.

2. The system according to claim 1, wherein each guide member is configured to extend adjacent a lower side or longitudinal edge of the freight container to provide a restraint or stop against lateral or sideways movement of the freight container in the cargo hold.

3. The system according to claim 1, wherein the at least one projection projects downwards from each elongate guide member to be received in the corresponding slot or groove in each of the bracket members, wherein a locking element or pin is insertable through the at least one projection to prevent removal or separation from the corresponding slot or groove.

4. The system according to claim 1, wherein each bracket member includes at least one fastening portion with which the bracket member is secured to the base or floor of the cargo hold.

5. The system according to claim 1, wherein each of the elongate guide members includes at least one locking mechanism for engaging and locking the freight container, or for engaging and locking a pallet upon which the freight container is supported, against movement in a longitudinal or loading direction.

6. The system according to claim 5, wherein each locking mechanism comprises a latch that is movable between a retracted position and an extended position and an actuating member that is manually operable to actuate movement of the latch between the retracted and extended positions, wherein the actuating member is positioned and configured for operation by foot.

7. The system according to claim 6, wherein the actuating member of each locking mechanism is provided on a laterally outward or outboard side of the respective guide member, and wherein the latch is configured to project from the guide member in a laterally inward or inboard direction in the extended position.

8. The system according to claim 7, wherein each of the elongate guide members includes a plurality of locking mechanisms corresponding to the number of bracket members that the guide member interconnects, wherein each of the locking mechanisms is aligned with one of the bracket members.

9. The system according to claim 1, further comprising a plurality of rollers configured and arranged to support the freight container in rolling movement in the loading direction, wherein the rollers are arranged between a pair of the elongate guide members, each of which extends adjacent a lower side edge or lower longitudinal edge of the freight container in the loading direction; wherein the rollers are provided in elongate support members that are configured to support and convey a freight container as it is loaded into the cargo hold; and wherein the support members extend in a longitudinal or loading direction and are arranged laterally inwards or inboard of the pair of the elongate guide members.

10. An aircraft having a cargo hold in a fuselage thereof, the cargo hold comprising a cargo handling system according to claim 1.

11. The system according to claim 4, wherein the at least one fastening portion is configured to engage and lock with a seat track profile in the base or floor of the cargo hold.

12. The system according to claim 4, wherein the at least one fastening portion on each bracket member is located inwards or inboard of the respective guide member connected with the end region thereof.

13. A cargo handling system for loading and securing one or more freight containers in a cargo hold of an aircraft, the system comprising:
  a plurality of elongate bracket members, each of which is configured to be secured to a base or floor of the cargo hold, wherein the bracket members are arranged in rows and extend substantially parallel and transverse to a loading direction;
  a plurality of elongate guide members, each of which is mounted on and interconnects end regions of a number of the bracket members arranged in a row, wherein each guide member forms a restraint or stop against lateral movement of a freight container loaded in the cargo hold, and wherein the bracket members extend transversely inwards or inboard of the elongate guide members;
  wherein each of the elongate guide members includes a plurality of locking mechanisms for engaging and locking the freight container, or for engaging and locking a pallet upon which the freight container is supported, against movement in a longitudinal or loading direction, the number of locking mechanisms corresponding to the number of bracket members that the guide member interconnects, wherein each locking mechanism comprises a latch that is movable between a retracted position and an extended position and an actuating member that is manually operable to actuate movement of the latch between the retracted and extended positions,
  wherein the actuating member of each locking mechanism is provided on a laterally outward or outboard side of the respective guide member and is configured for operation by foot, and wherein the latch is configured to project from the guide member in a laterally inward or inboard direction in the extended position.

* * * * *